United States Patent

[11] 3,620,637

| [72] | Inventor | George M. Brown<br>Parma, Ohio |
|---|---|---|
| [21] | Appl. No. | 841,774 |
| [22] | Filed | July 15, 1969 |
| [45] | Patented | Nov. 16, 1971 |
| [73] | Assignee | Century Drill and Tool Company<br>Chicago, Ill. |

[54] DRILL BIT STOP
7 Claims, 4 Drawing Figs.
[52] U.S. Cl. ........................... 408/202,
145/128
[51] Int. Cl. .................................. B23b 47/00,
B23b 49/00
[50] Field of Search ........................... 77/55, 55 S;
279/1 S; 145/128

[56] References Cited
UNITED STATES PATENTS

| 1,482,369 | 1/1924 | Kruschitzki | 77/55 S |
|---|---|---|---|
| 2,242,510 | 5/1941 | Cogsdill | 77/55 S |
| 2,823,563 | 2/1958 | Nipken | 77/55 S |
| 3,454,059 | 8/1969 | Sindelar | 77/55 S |

*Primary Examiner*—Francis S. Husar
*Attorney*—Mueller, Aichele & Rauner

ABSTRACT: First and second pieces each having a tapered bore therethrough are joined to form a housing by threading one piece into the other. A collet having resilient fingers at each end is positioned within the housing. The housing is placed on the bit and the pieces are threaded together with the tapered bores closing the fingers of the collet about the bit to lock the housing in the desired position thereon to limit the passage of the bit through the workpiece.

PATENTED NOV 16 1971 3,620,637

INVENTOR.
GEORGE M. BROWN

BY *Mueller, Aichele & Rauner*

ATTORNEYS.

3,620,637

DRILL BIT STOP

BACKGROUND OF THE INVENTION

Stops which are positioned on the drill bit itself for limiting the passage of the bit through a workpiece have been proposed. These stops, however, have been designed to provide a great accuracy, such as is required in machine toolwork. Providing this accuracy has necessitated the use of a complicated structure which is relatively expensive to make. Furthermore, the proposed stops are so constructed as to limit the diameters of the drill bits that they will receive. This necessitates the machine operator having a plurality of different size stops on hand to accommodate a wide range of bit sizes. Because of the cost involved and the limitation of the number of bit sizes each stop will accommodate, they have never appealed to the home repairman who is less interested in accuracy and more interested in cost and convenience.

SUMMARY OF THE INVENTION

It is an object of this invention to provide a uniquely simple and relatively inexpensive stop for limiting the depth that a boring tool can go in a workpiece.

It is another object of this invention to provide a single drill bit stop which may be used with a wide range of bit sizes.

In one embodiment of this invention a housing is formed by threading together first and second parts each of which have a bore therethrough of a given diameter that tapers at one end of each part to a diameter less than the given diameter. With the parts threaded together the bores are aligned to form a passage through the housing. A collet having a rigid central body portion of a given diameter and integral first and second resilient fingerlike end portions is positioned in said passage within the housing. Each of the fingerlike end portions has a taper similar to the tapered walls of the bore and engage the same so that with the first part threaded into the second part their tapered walls engage the fingers to close each end of the collet. In use, the housing is positioned on the boring tool at the desired distance from the distal end thereof and the first part is threaded into the second part thereby closing each of the fingerlike end portions on the boring tool to lock the housing in position. The housing so positioned limits the passage of the boring tool through the workpiece by striking the same when the tool has entered the workpiece to the desired depth.

DETAILED DESCRIPTION

Figure 1:
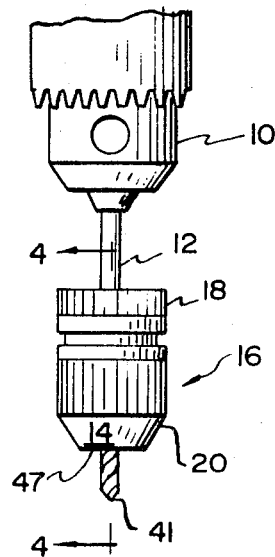
FIG. 1 is a side elevation view of the stop positioned on a drill bit in accordance with this invention.
Figure 2:
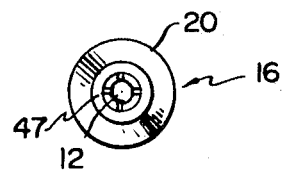
FIG. 2 is a bottom plan view of the bit stop of FIG. 1.
Figure 3:
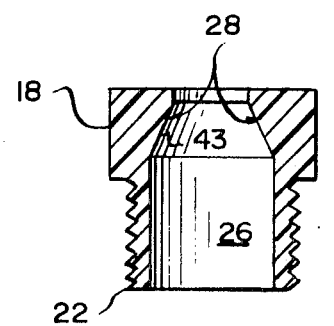
FIG. 3 is an exploded cross-sectional view of the bit stop of FIG. 1.
Figure 3:
Figure 3:
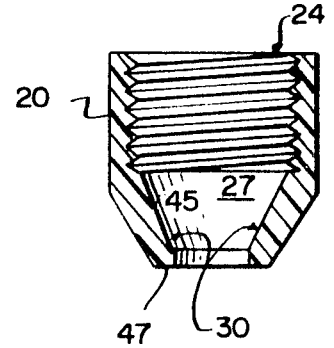
Figure 4:
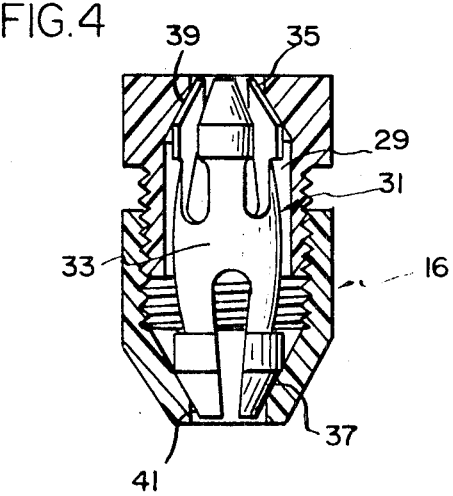
FIG. 4 is a partial cross section taken substantially along the line 4—4 of FIG. 1.

FIG. 1 shows a drill chuck 10 in which has been inserted a bit 12. In many drilling operations, it is desirable to be able to limit the depth that the drill bit can pass into the workpiece. I have invented such a stop 14 which is shown positioned on the bit 12. The stop 14 consists of a housing 16 formed from the parts 18 and 20 (FIG. 3). The part 18 has one end 22 with male threads thereon, and the part 20 has one end 24 in which is formed a threaded female socket. The two pieces are threaded together to complete the housing as shown in FIG. 4.

Each piece has a bore 26 and 27 respectively of a given diameter. The bores 26 and 27 taper at the ends of the pieces opposite the threaded portions to a smaller diameter, as shown at 28 and 30. As can be seen in FIG. 4, when the pieces are threaded together to complete the housing the bores 26 and 27 are aligned to provide the passage 29 for receiving a collet 31.

The collet 31 includes a rigid central body portion 33 which is located intermediate resilient fingerlike end portions 35 and 37. Each of the resilient finger portions has a taper such as at 39 and 41 that approximates the taper of the bores 26 and 27. The matching tapers on the resilient fingers and the bores among other things provide a self-aligning feature for the collet 31 when it is positioned within the passage 29 of the housing 16.

In operation, the operator inserts the collet in the part 20, for instance, and then threads the part 18 therein to form the housing. The housing is then fitted into the bit 12 and positioned the desired distance from the distal end 41 of the bit 12. This distance can be measured with a ruler if accuracy is required or can be done by eye if it is not. When the housing is located at the desired position, the parts 18 and 20 are threaded into one another such that the tapered walls 43 and 45 of the bores 26 and 27 respectively engage the tapered resilient finger portions 35 and 37. The tighter the pieces are threaded together the more pressure is applied to the resilient fingers until they engage the drill bit at which time the pieces are turned fingertight. Therefore, the bit 12 is tightly engaged by the fingers at each end of the collet locking the housing in position. Subsequently, when the bit has passed into the workpiece the desired depth, the flat bottom surface 47 on the part 20 will strike the workpiece preventing further penetration of the bit. In order to prevent damage to the workpiece, and to reduce the cost of the device, each of the parts 18 and 20 and collet 31 are molded from a synthetic self-lubricating material such as plastic.

It is believed to be clear from the foregoing description of the stop 16 that since it utilizes only three parts, all of which can be easily molded from plastic, the cost of the stop is relatively inexpensive making it an attractive item for the home workshop. Furthermore, by using the double ended collet 31 the stop may be adopted for use with a wide variety of bit sizes. The only limit on the size of the bit that can be used with the stop 16 is the diameter of the rigid, central body portion 33 of the collet. Because the fingers at each end of the collet can be closed on any size bit that will fit through the central body of the collet, there is actually no minimum size limitation to the bit which can be used with this deice. This makes it especially attractive because one stop 16 can be made which will fit most of the bit sizes used in the home.

What has been described, therefore, is a unique relatively inexpensive drill bit stop that can be readily adapted for use with a wide range of bit sizes.

I claim:

1. A stop for limiting the passage of a boring tool through a workpiece, including in combination, a housing having first and second parts, each part having a bore therethrough of a given diameter that tapers at one end of said part to a diameter less than said given diameter, said first part being threaded into said second part to connect the same with the bores being aligned to form a passage through said housing, a collet positioned in said passage, said collet comprising a rigid central body portion of a given diameter and integral first and second resilient end portions, said end portions each comprising a plurality of finger portions, said collet extending substantially the entire length of said passage formed with said first and second parts of said housing being threaded to one another for attaching the same to the boring tool thereby presenting a compact structure.

2. A stop for limiting the passage of a drill bit through a workpiece, including in combination, a housing having first and second parts, each part having a bore therethrough, adjustable means connecting said parts with the bores being aligned to form a passage through said housing, collet means positioned in said passage of said housing, said collet means comprising a hollow body portion having a cross section of a predetermined diameter located intermediate resilient end portions, each resilient end portion of said collet means including a plurality of slots extending from said hollow body portion to form at least three fingers, and said first and second parts of said housing being adjusted with respect to one another for closing the fingers of each resilient end portion of said collet means about the drill bit to lock said housing in a position thereon determined by the depth of the hole to be drilled.

3. The drill bit stop of claim 1 wherein said housing is made of a synthetic material to protect the workpiece with said housing striking the same.

4. The drill bit stop of claim 1 wherein said first and second parts of said housing include male and female threaded portions respectively for adjustably connecting said parts.

5. The boring tool of claim 1 wherein said first and second parts of said housing are made of a synthetic material so said housing striking the workpiece will not harm the same.

6. The drill bit stop of claim 1 wherein said fingers of each resilient end portion of said collet means taper to form an opening in each end thereof which is smaller in diameter than the diameter of said hollow body portion.

7. The boring tool stop of claim 1 wherein said fingers are closed to a diameter significantly smaller than said given diameter of said body portion with said threading action of said housing parts whereby the stop is usable with boring tools having a diameter only slightly smaller than said diameter of said body portion, to boring tools having a diameter greatly reduced from said diameter of said body portion.

* * * * *